(12) United States Patent
Zhang et al.

(10) Patent No.: US 7,980,748 B2
(45) Date of Patent: Jul. 19, 2011

(54) LIGHTING SYSTEM INCLUDING LIGHT GUIDE WITH REFLECTIVE MICRO STRUCTURES ON EDGE SURFACES

(75) Inventors: Tong Zhang, Oxon (GB); David James Montgomery, Oxfordshire (GB); James Rowland Suckling, Surrey (GB); Harry Garth Walton, Oxford (GB); Jonathan Mather, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 246 days.

(21) Appl. No.: 12/200,126

(22) Filed: Aug. 28, 2008

(65) Prior Publication Data
US 2010/0053996 A1 Mar. 4, 2010

(51) Int. Cl.
*F21V 7/04* (2006.01)
*G01D 11/28* (2006.01)
(52) U.S. Cl. ........... 362/626; 362/623; 362/627; 362/26
(58) Field of Classification Search ............ 362/26, 362/615, 623, 625, 626, 627, 621, 622
See application file for complete search history.

(56) References Cited

U.S. PATENT DOCUMENTS

| | | | | |
|---|---|---|---|---|
| 5,461,547 | A * | 10/1995 | Ciupke et al. | 362/617 |
| 7,686,495 | B2 * | 3/2010 | Noba | 362/612 |
| 2005/0105282 | A1 | 5/2005 | Yu et al. | |
| 2006/0146573 | A1 * | 7/2006 | Iwauchi et al. | 362/621 |
| 2007/0086208 | A1 | 4/2007 | Lee et al. | |

FOREIGN PATENT DOCUMENTS

| | | |
|---|---|---|
| JP | 11-149813 A | 6/1999 |
| JP | 2000-127847 A | 5/2000 |
| JP | 2002-162912 A | 6/2002 |
| JP | 2004-127810 A | 4/2004 |
| JP | 2005-285702 A | 10/2005 |

OTHER PUBLICATIONS

Japanese Office Action (with English translation) for corresponding Japanese Application No. 2009-198451 dated Feb. 15, 2011.

* cited by examiner

*Primary Examiner* — Ismael Negron
(74) *Attorney, Agent, or Firm* — Renner, Otto, Boisselle & Sklar, LLP

(57) ABSTRACT

A light guide includes a light guide substrate having a top surface through which light is to be emitted, a bottom surface, an incident edge surface through which incident light is to be introduced into the light guide substrate, and another edge surface. The another edge surface includes at least one micro structure operative to reflect at least a portion of the incident light, which travels through the light guide substrate and is incident on the another edge surface, back within the light guide substrate.

16 Claims, 6 Drawing Sheets

LIGHTING SYSTEM INCLUDING LIGHT GUIDE WITH REFLECTIVE MICRO STRUCTURES ON EDGE SURFACES

TECHNICAL FIELD

The present invention relates generally to light guides, and more particularly to light guides having enhanced reflectance and less light leakage from certain surfaces of the light guide.

BACKGROUND OF THE INVENTION

Lighting systems that utilize light guides are known in the art. In such lighting systems, it is important to reduce the leakage of light from certain surfaces of the light guide as much as possible. By reducing such leakage, the optical efficiency of the system may be maximized. In addition, it is possible to avoid a brighter edge pattern around the light guide. Avoiding a brighter edge pattern is particularly important for light guide panel tiling illumination system.

FIG. 1 illustrates a conventional light guide-based lighting system. Light from a source 10 is coupled into a light guide 12 via an incident edge surface 14. The light from the light source 10 travels within the light guide 12 and is subsequently extracted out by extraction features 16 formed on a bottom surface 18 of the light guide 12. The extracted light 20 is emitted through a top surface 22 of the light guide 12. In such a conventional lighting system, however, even though the extraction features 16 may be well designed and manufactured there may still be light leakage taking place. As is shown in FIG. 1, light leakage 24 will still occur at an edge surface 26 of the light guide 12 and thereby continue to reduce optical efficiency and brightness uniformity.

Previous efforts to reduce light leakage in a light guide involve including structures on the surfaces of the light guide. For example, US 2007/0086208 A1 (Seoung Ho Lee et al.) describes a microstructure on the light guide to prevent light loss on an incident surface facing the light source unit. US 2005/0105282 A1 (Tai-Cherng Yu et al.) describes a surface light source comprising a light guide plate with a large number of prisms at the emitting surface, in which a distance separating two adjacent prisms changes according to an intensity of the light beams received from the light source.

While such previous efforts may be suitable for many applications of lighting systems, there remains a strong need in the art for further reduction in light leakage within a light guide. In particular, there remains a strong need for a light guide which further maximizes optical efficiency and reduces formation of brighter edge patterns.

SUMMARY OF THE INVENTION

According to an aspect of the invention, a light guide is provided which includes a light guide substrate having a top surface through which light is to be emitted, a bottom surface, an incident edge surface through which incident light is to be introduced into the light guide substrate, and another edge surface. The another edge surface includes at least one micro structure operative to reflect at least a portion of the incident light, which travels through the light guide substrate and is incident on the another edge surface, back within the light guide substrate.

According to another aspect, the another edge surface is opposite to the incident edge surface.

In accordance with another aspect, the at least one micro structure comprises a prism structure continuous along the another edge surface.

According to another aspect, the another edge surface includes a plurality of microstructures operative to reflect at least a portion of the incident light, which travels through the light guide substrate and is incident on the another edge surface, back within the light guide substrate.

In accordance with still another aspect, the plurality of micro structures each represent a prism structure.

According to still another aspect, the top angle of the prism structures is approximately equal to 90°.

According to yet another aspect, the light guide further includes a mirror adjacent the another edge surface to reflect incident light which leaks through the another edge surface, back into the light guide substrate.

In accordance with another aspect, the plurality of micro structures on the another edge surface do not include a reflective coating.

According to another aspect, the plurality of micro structures on the another edge surface include a reflective coating.

According to yet another aspect, the incident edge surface includes another plurality of micro structures which are operative to reflect incident light back within the light guide that has previously been reflected towards the incident edge surface by the another edge surface.

With still another aspect, the another plurality of micro structures each represent a prism structure.

In accordance with another aspect, the top angle of the prism structures in the another plurality of micro structures is approximately equal to 90°.

According to another aspect, the incident edge surface includes another plurality of micro structures which are operative to reflect incident light back within the light guide that has previously been reflected towards the incident edge surface by the another edge surface, and the light guide further includes a mirror adjacent the another edge surface to reflect incident light which leaks through the another edge surface back into the light guide substrate, and another mirror adjacent the incident edge surface to reflect the reflected incident light which leaks through the incident edge surface back into the light guide substrate.

In still another aspect, a light source is positioned between the incident edge surface and the another mirror adjacent the incident edge surface.

With yet another aspect, the light guide further includes light extraction features formed on the bottom surface.

According to another aspect, the plurality of micro structures have dimensions greater than a wavelength of the incident light and less than the dimensions of the light guide substrate itself.

In yet another aspect, the dimensions of the micro structures are on the order of tens of microns.

In accordance with another aspect, the light guide is a molded structure.

According to another aspect, a lighting system is provided which includes a light source and a light guide as herein described and arranged such that incident light from the light source is introduced via the incident edge surface.

According to another aspect, a light guide is provided which includes a light guide substrate having a top surface through which light is to be emitted, a bottom surface, and an incident edge surface through which incident light is to be introduced into the light guide substrate. The bottom surface includes a plurality of prism shaped structures operative to reflect incident light within the light guide substrate back towards the light guide substrate.

In yet another aspect, the plurality of prism shaped structures have a substantially 90° top angle.

According to another aspect, the light guide further includes light extraction features on the top surface.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
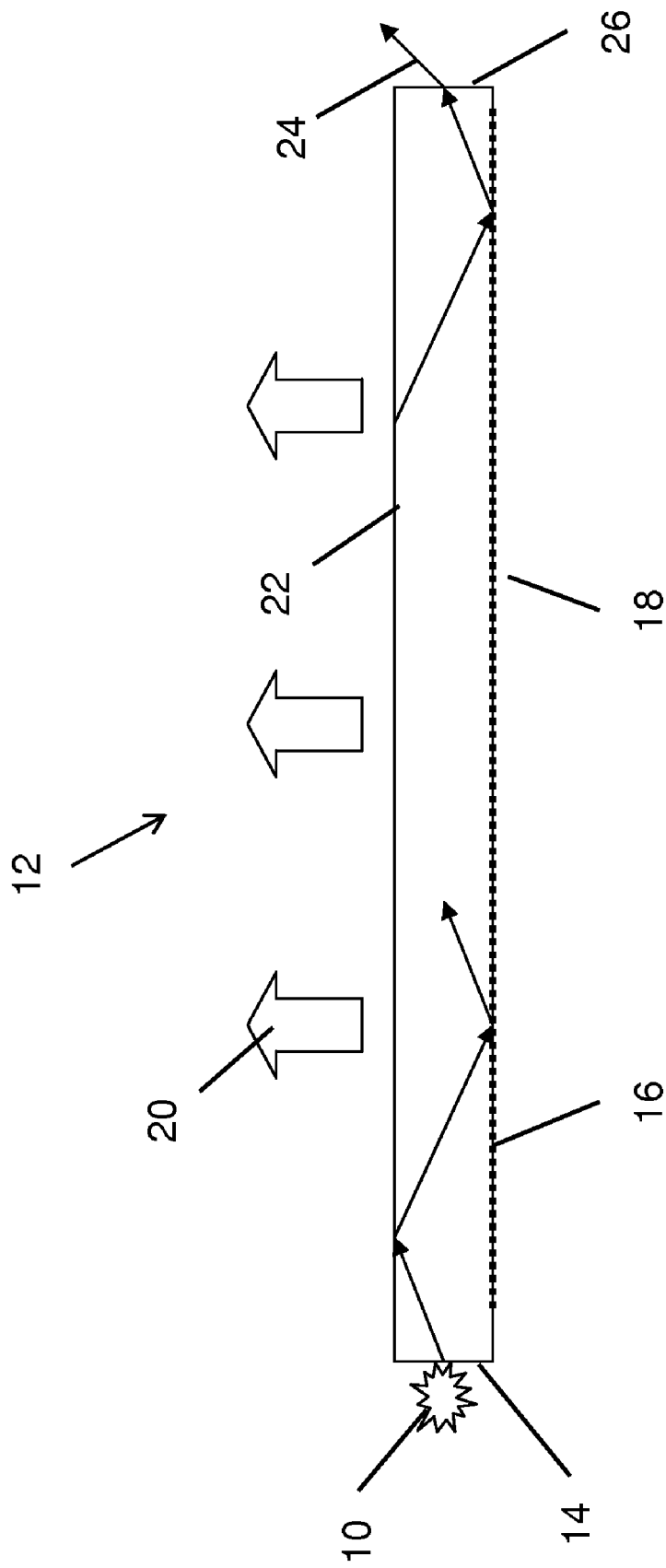
FIG. 1 schematically illustrates in vertical cross section a conventional lighting system using a light guide.

The present invention will now be described with reference to the drawings, wherein like reference numerals are used to refer to like elements throughout.

In accordance with the present invention, light leakage is reduced in a light guide without necessitating extra components within the lighting system. The light guide may be made by injection molding or other low cost production techniques. Thus, the present invention provides improved performance in lighting systems at relatively low cost.

Figure 2:
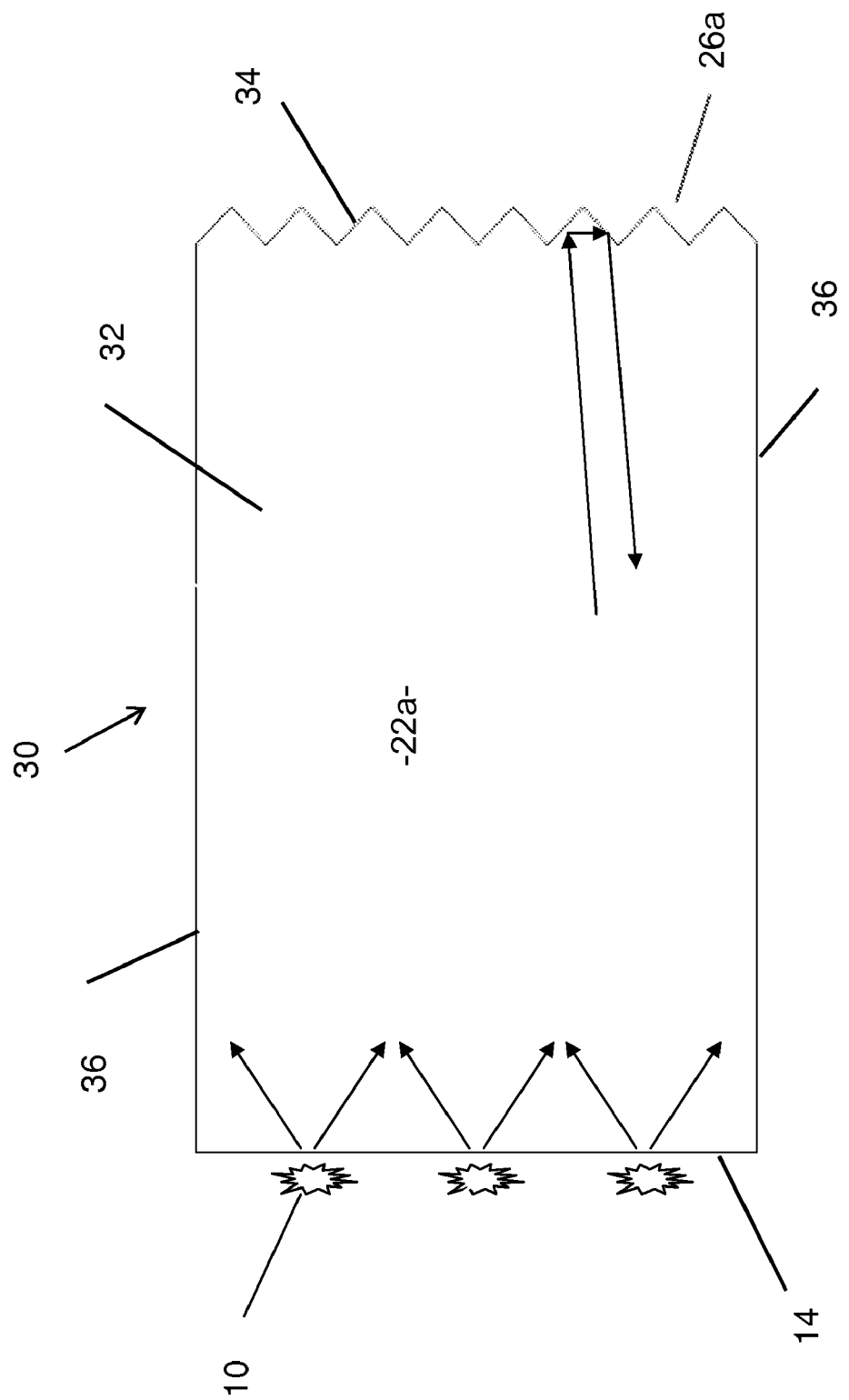
FIG. 2 schematically illustrates in top view a lighting system using a light guide having a micro prism structure in an edge surface opposite the incident edge surface in accordance with an embodiment of the invention.

Referring now to FIG. 2, a lighting system 30 is shown in accordance with an exemplary embodiment of the present invention. Elements common with the conventional lighting system of FIG. 1 share common reference numerals. The lighting system 30 includes a light guide 32 in accordance with the invention, and one or more light sources 10. The light source 10 may be any type of conventional light source, the particulars of which are not germane to the present invention.

The light guide 32 is in the form of a generally rectangular substrate, for example, and may be made of conventional materials used to manufacture light guides (e.g., highly transparent synthetic resins such as acrylic resin, polycarbonate resin, vinyl chloride resin, etc.). As previously mentioned, the light guide 32 may be made using low cost production techniques such as injection molding or the like.

The light guide 32 includes an incident edge surface 14 through which the light source 10 introduces light into the light guide 32. In addition, the light guide 32 includes micro structures 34 at the edge surface 26' opposite the incident edge surface 14 for inducing total-internal-reflection (TIR) within the light guide 32. For example, the micro structures 34 may include micro prism structures having a top angle of approximately 90 degrees(°) formed on the edge surface 26'. Alternatively, other types of micro structures 34 for inducing TIR may be used without departing from the scope of the invention as will be appreciated by those having ordinary skill in the art.

Specifically, the present invention makes use of the fact that some types of structures on the surface of a light guide can increase the chance of TIR. By including the micro structures 34 on the edge surface 26, reflections of the light back into the light guide are increased. Therefore, the amount of light leaking from the light guide 32 is reduced. While the micro structures 34 are preferably formed on the edge surface 26 opposite the incident edge surface 14, the micro structures 34 may also be included on the side edges 36 without departing from the scope of the invention.

Figure 3:
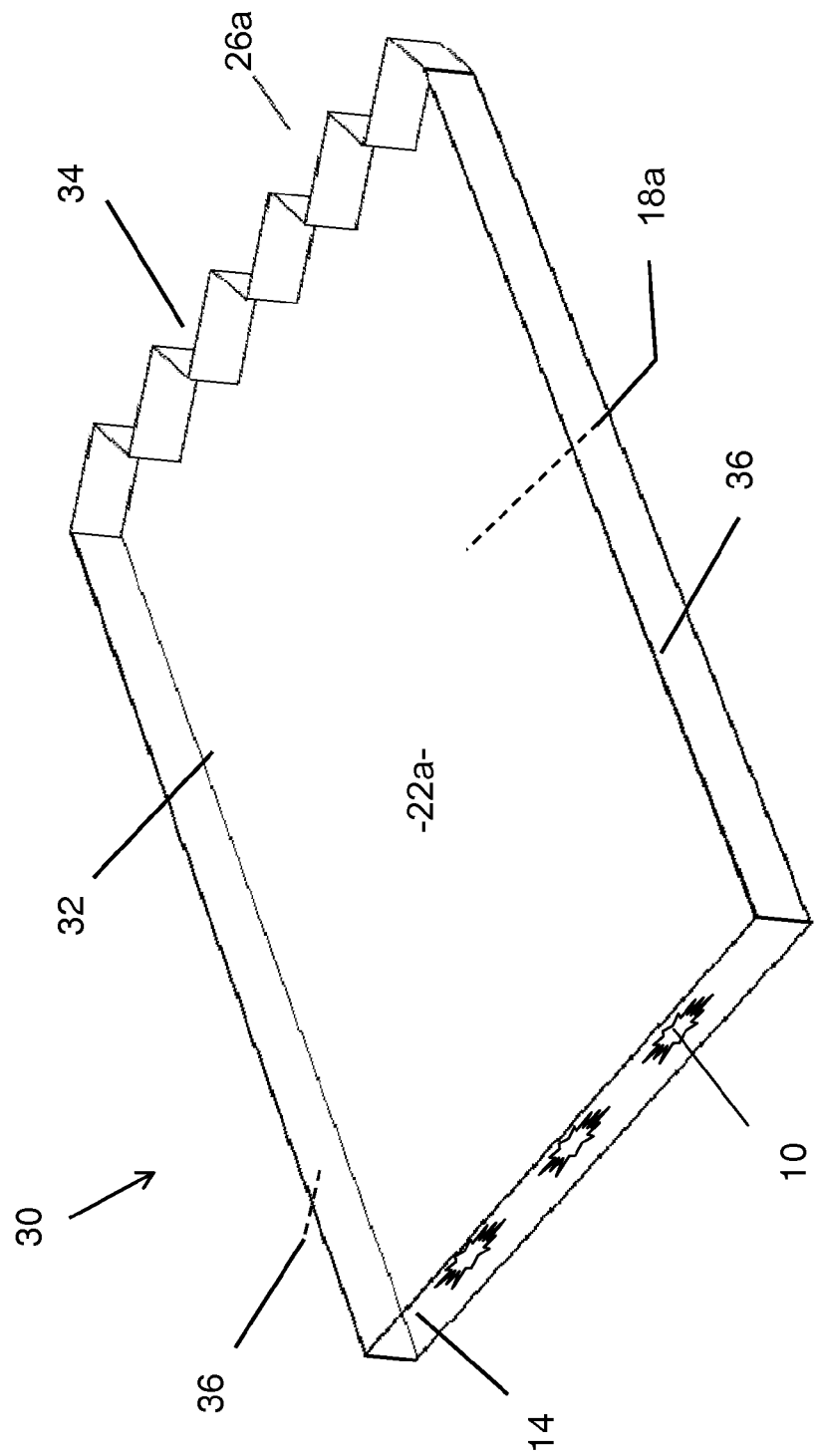
FIG. 3 is a perspective view of the light guide of FIG. 2 in accordance with an embodiment of the invention.

FIG. 3 provides a three-dimensional representation of the light guide 32. Light from the light source 10 is introduced into the light guide via the incident edge surface 14 as previously mentioned. The light travels through the light guide 32. Conventional light extraction features (not shown) are formed on the bottom surface 18 and cause light traveling within the light guide 32 to be extracted from the light guide 32 and emitted from the top surface 22, as is desired. Light within the light guide 32 which is not extracted initially will hit the surface of the micro structures 34 (e.g., micro prisms) at the edge surface 26. Because of the total internal reflecting properties of the micro structures 34, there is a high likelihood that TIR will take place. When TIR occurs, the light will be reflected back into the light guide 32 and there is no loss of the light. Compared to a flat edge surface 26' without any micro structures 34, light leakage may be reduced down to 40%, for example.

It is noted that there is no coating process required on the micro structures 34. For example, it is not necessary to form a reflective coating on the edge surface 26'. Yet, it is still possible to reduce substantially the amount of light leakage from the edge surface 26'.

In any light guide type lighting system, a lesser number of light sources 10 is preferred particularly because of cost and assembly issues. However, a drawback of this cost-down solution is the problem of degraded brightness uniformity which is often called 'hot spot'. As one solution, light inside the light guide is cycled back and forth and the system effectively becomes a multi-light-source system with light sources located on both ends of the light guide. Such approach makes the design of the extraction features 16 much easier. The results are that of reduced cost on the production as well.

Thus, to further increase reflectance at the edge surface 26' and thereby decrease light leakage, a reflective coating may also be included on the edge surface 26'. For example, a silver coating may be formed on the outer surface of the micro structures 34 on the edge surface 26'.

Figure 4:
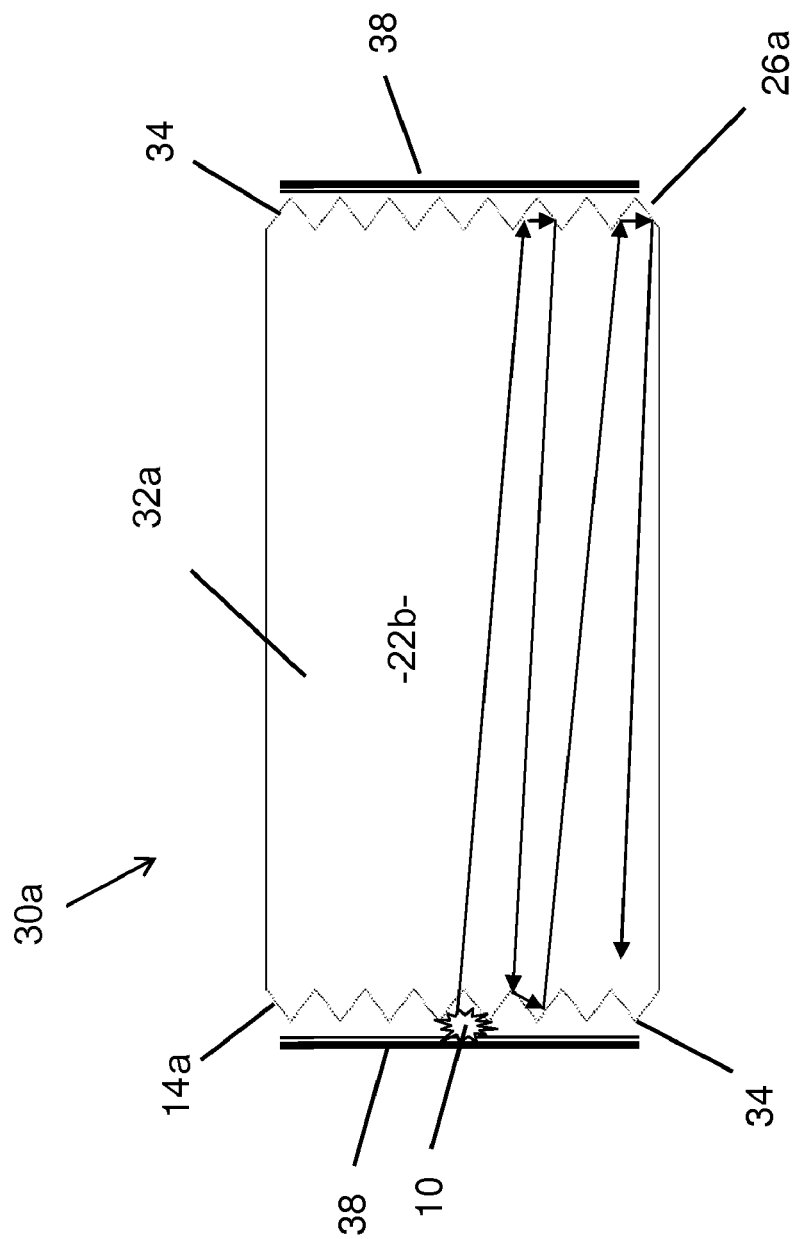
FIG. 4 is a top view of a light guide with two surfaces modified for higher reflectance in accordance with another embodiment of the invention.

As long as there is not TIR at the edges of the light guide 32, light loss will occur each time the light is reflected which is critical for a multi-reflection configuration as noted above. Accordingly, FIG. 4 illustrates an embodiment of the present invention that takes advantage of the above-described micro structures in combination with high reflectance mirrors. In this embodiment, the light guide 32' includes micro structures 34 on both the edge surface 26' and the incident edge surface 14'. Further, the lighting system 30' includes high reflectance mirrors 38 to increase the reflectance of the edge surfaces 14 and 26'.

More particularly, the lighting system 30' includes a high reflectance mirror 38 adjacent the edge surface 26'. To the extent the micro structures 26' on the edge surface 26' do not eliminate light leakage completely, light leaking from the edge surface 26' is reflected by the mirror 38 back into the light guide 32'. Another high reflectance mirror 38 is provided adjacent the incident edge surface 14' with the light source 10 therebetween.

Light from the light source 10 is introduced via the incident edge surface 14' and the light travels through the light guide 32' as in the previous embodiment. The micro structures 34 on the edge surface 26' reflect light incident thereon back towards the light guide 32' as previously described. However, in the event the micro structures 34 are unable to reflect all the light and some light still leaks from the edge surface 26', the mirror 38 serves to reflect the leaking light back into the light guide 32' via the edge surface 26'.

Light reflected by the micro structures 34 on the edge surface 26' and the mirror 38 adjacent thereto travels back towards the incident edge surface 14' and the micro structures 34 thereon. Similar to the micro structures 34 formed on the edge surface 26', the micro structures 34 are designed to reflect the light back towards the light guide 32'. Light which is not reflected and leaks from the incident edge surface 14' still is reflected back into the light guide 32' by the mirror 6 adjacent the incident edge surface 14'.

Consequently, light within the light guide 32' can travel much longer or be reflected more times with an acceptable amount of loss according to the embodiment of FIG. 4.

Figure 5:
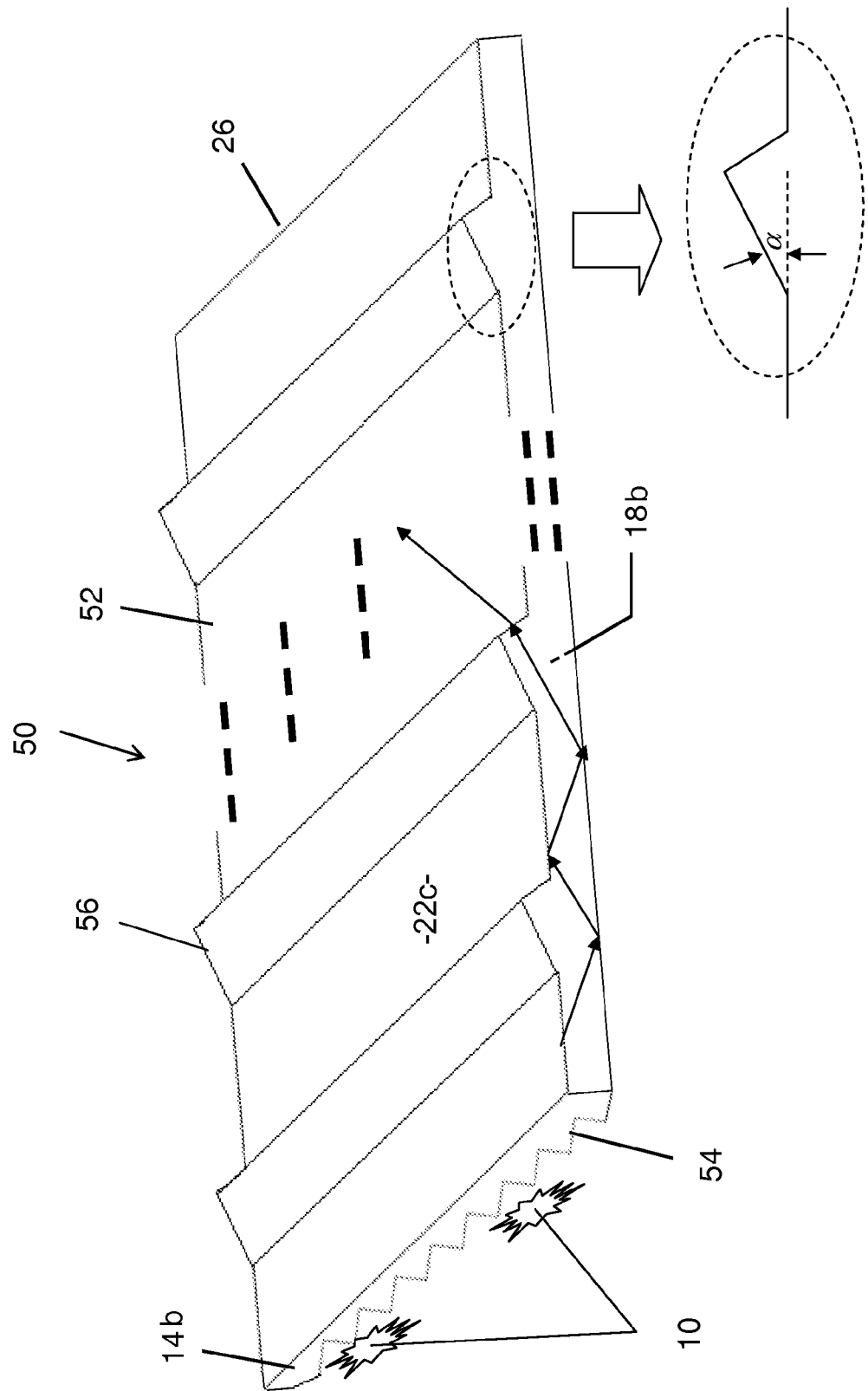
FIG. 5 is a perspective view of a light guide having a prism-shaped bottom surface in accordance with another embodiment of the invention.

FIG. 5 illustrates a lighting system 50 including a light guide 52 in accordance with another embodiment of the invention. In this embodiment, the bottom surface 18 of the light guide 52 comprises prism-shaped features 54 preferably with an approximately 90° top angle. Light extracting features 56 are formed on the top surface 22'. By carefully forming the light extracting features 56, more than 90% of the light introduced from the light source 10 into the light guide 52 will go upward so as to be emitted from the top surface 22'. The rest of the light will hit the bottom surface 18 with the prism shaped features 54 and with TIR taking place thereat light will again be extracted from the light guide. Therefore, the reflector sheet that is normally used in a backlight system may be omitted, or used in combination with such features 54 for increased optical efficiency. Note that the extracting features do not have to be a straight line but can be many small discrete structures with the same shape (or angle α) or different shapes suitable for the same purpose.

Figure 6:
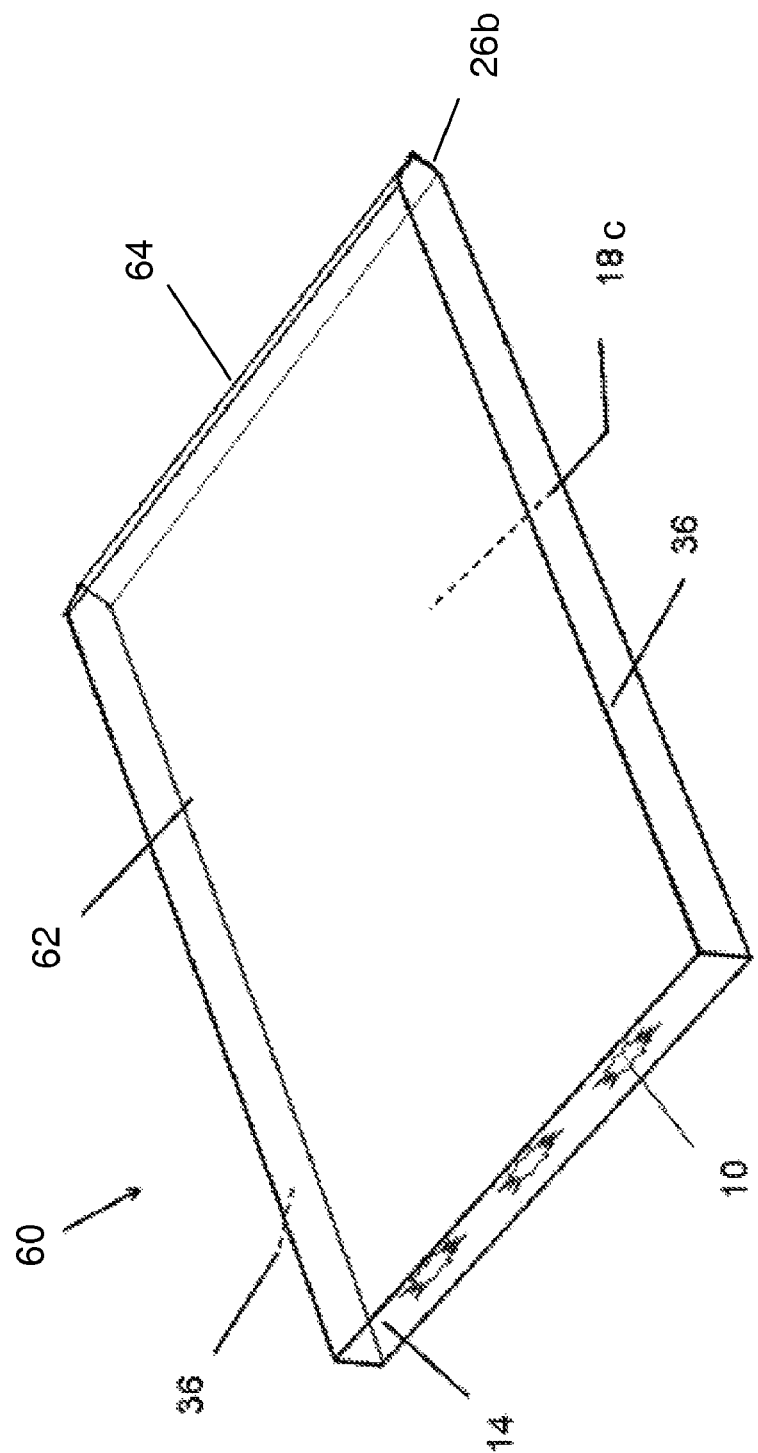
FIG. 6 is a perspective view of a light guide in accordance with another embodiment of the invention.

FIG. 6 illustrates a light guide 60 including a light guide 62 in accordance with yet another embodiment of the invention. The embodiment is similar to that of FIG. 3 described above except that the plurality of micro structures 34 are replaced by a single micro structure 64 such as a prism. For example, the prism 64 is rotated 90° relative to the orientation of each of the micro prisms 34 in the embodiment of FIG. 3 and runs along the edge surface 26". The top angle of the prism 64 again may be, for example, approximately equal to 90°. Thus, again the prism 64 is operative to reflect at least a portion of the incident light, which travels through the light guide and is incident on the edge surface 26", back within the light guide.

The dimensions of the micro structures being mentioned above are not critical as long as they are not as small as the wavelength order and not bigger than the light guide itself. Dimensions of tens of micros are typically quite suitable to achieve the above described improvements and are achievable using an injection molding process. Further, although the prism structures shown herein include sharp edge lines, it will be appreciated that such edge lines may be slightly rounded as a result of production techniques, for example. Nevertheless, such structures are still within the intended scope of the invention as will be appreciated.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:
1. A light guide, comprising:
  a light guide substrate having a top surface through which light is to be emitted;
  a bottom surface;
  an incident edge surface through which incident light is to be introduced into the light guide substrate; and
  another edge surface,
  wherein the another edge surface includes a plurality of microstructures configured to induce total-internal-reflection (TIR) of at least a portion of the incident light, which travels through the light guide substrate and is incident on the another edge surface, and thereby reflect the incident light back within the light guide substrate without necessitating a reflective coating on the at least one micro structure; and
  wherein the plurality of micro structures on the another edge surface do not include a reflective coating.

2. The light guide of claim 1, wherein the another edge surface is opposite to the incident edge surface.

3. The light guide of claim 1, wherein the at least one micro structure comprises a prism structure continuous along the another edge surface.

4. The light guide of claim 1, further comprising a mirror adjacent the another edge surface to reflect incident light which leaks through the another edge surface, back into the light guide substrate.

5. The light guide of claim 1, further comprising light extraction features formed on the bottom surface.

6. A lighting system, comprising:
  a light source; and
  a light guide according to claim 1, arranged such that incident light from the light source is introduced via the incident edge surface.

7. The light guide of claim 1, wherein the incident edge surface includes a plurality of micro structures which are operative to reflect incident light back within the light guide that has previously been reflected towards the incident edge surface by the another edge surface.

8. The light guide of claim 1, wherein the plurality of micro structures each represent a prism structure.

9. The light guide of claim 8, wherein the prism structures include a top angle that is approximately equal to 90°.

10. The light guide of claim 1,
  wherein the incident edge surface includes another plurality of micro structures which are operative to reflect incident light back within the light guide that has previously been reflected towards the incident edge surface by the another edge surface, and
  further comprising a mirror adjacent the another edge surface to reflect incident light which leaks through the another edge surface back into the light guide substrate, and another mirror adjacent the incident edge surface to reflect the reflected incident light which leaks through the incident edge surface back into the light guide substrate.

11. The light guide of claim 10, further comprising a light source positioned between the incident edge surface and the another mirror adjacent the incident edge surface.

12. The light guide of claim 1, wherein the plurality of micro structures have dimensions greater than a wavelength of the incident light and less than the dimensions of the light guide substrate itself.

13. The light guide of claim 12, wherein the dimensions of the micro structures are on the order of tens of microns.

14. The light guide of claim 1, wherein the incident edge surface includes another plurality of micro structures which are operative to reflect incident light back within the light guide that has previously been reflected towards the incident edge surface by the another edge surface.

15. The light guide of claim 14, wherein the another plurality of micro structures each represent a prism structure.

16. The light guide of claim 15, wherein the prism structures in the another plurality of micro structures include a top angle that is approximately equal to 90°.

* * * * *